(12) United States Patent
Schwab

(10) Patent No.: US 6,353,699 B1
(45) Date of Patent: *Mar. 5, 2002

(54) METHOD AND APPARATUS FOR COMPILING AUDIO/VIDEO INFORMATION FROM REMOTE SITES INTO A FINAL VIDEO PROGRAM

(76) Inventor: Barry H. Schwab, 5298 Cedarhurst Dr., West Bloomfield, MI (US) 48322

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/393,493

(22) Filed: Feb. 24, 1995

Related U.S. Application Data

(63) Continuation-in-part of application No. 08/205,885, filed on Mar. 3, 1994, now abandoned.

(51) Int. Cl.$^7$ ................................................. H04N 5/91
(52) U.S. Cl. .......................... 386/46; 725/144; 725/145; 725/93; 725/116; 348/722; 386/95
(58) Field of Search ........................ ; 360/32; 386/131, 386/46, 109, 112, 124; 348/458, 459, 445, 441; 725/144–147, 114–117, 91–94; H04N 5/76, 5/91

(56) References Cited

U.S. PATENT DOCUMENTS

| | | | |
|---|---|---|---|
| 4,739,398 A | * | 4/1988 | Thomas et al. ............... 725/22 |
| 4,764,870 A | * | 8/1988 | Haskin ....................... 348/443 |
| 5,097,349 A | * | 3/1992 | Nomura et al. ............. 358/335 |
| 5,130,792 A | * | 7/1992 | Tindell et al. ................. 348/7 |
| 5,253,275 A | * | 10/1993 | Yurt et al. ...................... 348/7 |
| 5,262,875 A | * | 11/1993 | Mincer et al. .............. 358/335 |
| 5,581,479 A | * | 12/1996 | McLaughlin et al. ....... 725/145 |

* cited by examiner

*Primary Examiner*—Vincent F. Boccio
(74) *Attorney, Agent, or Firm*—Plunkett & Cooney, PC; Arnold S. Weintraub

(57) ABSTRACT

Video images and/or audio clips are rapidly and efficiently assembled into a finished program master recording for playback, including subsequent duplication. The images and audio portions may be collected locally or from remote sites in a variety of still video, motion, or multimedia formats. To reduce bandwidth or storage requirements, proprietary or commercially available compression/decompression data algorithms preferably are utilized during transmission and accumulation. Once a complete program is available the images and/or audio portions may be replayed automatically in a predetermined sequence, thereby allowing the program master video tape or disc to be recorded and distributed in a timely manner. As an alternative, the program presentation may be played back directly to a plurality of video recorders to effect duplication. In a further alternative, the program presentation may be made available over communication links, allowing users to access the program information in blocks or by way of user-directed search.

14 Claims, 3 Drawing Sheets

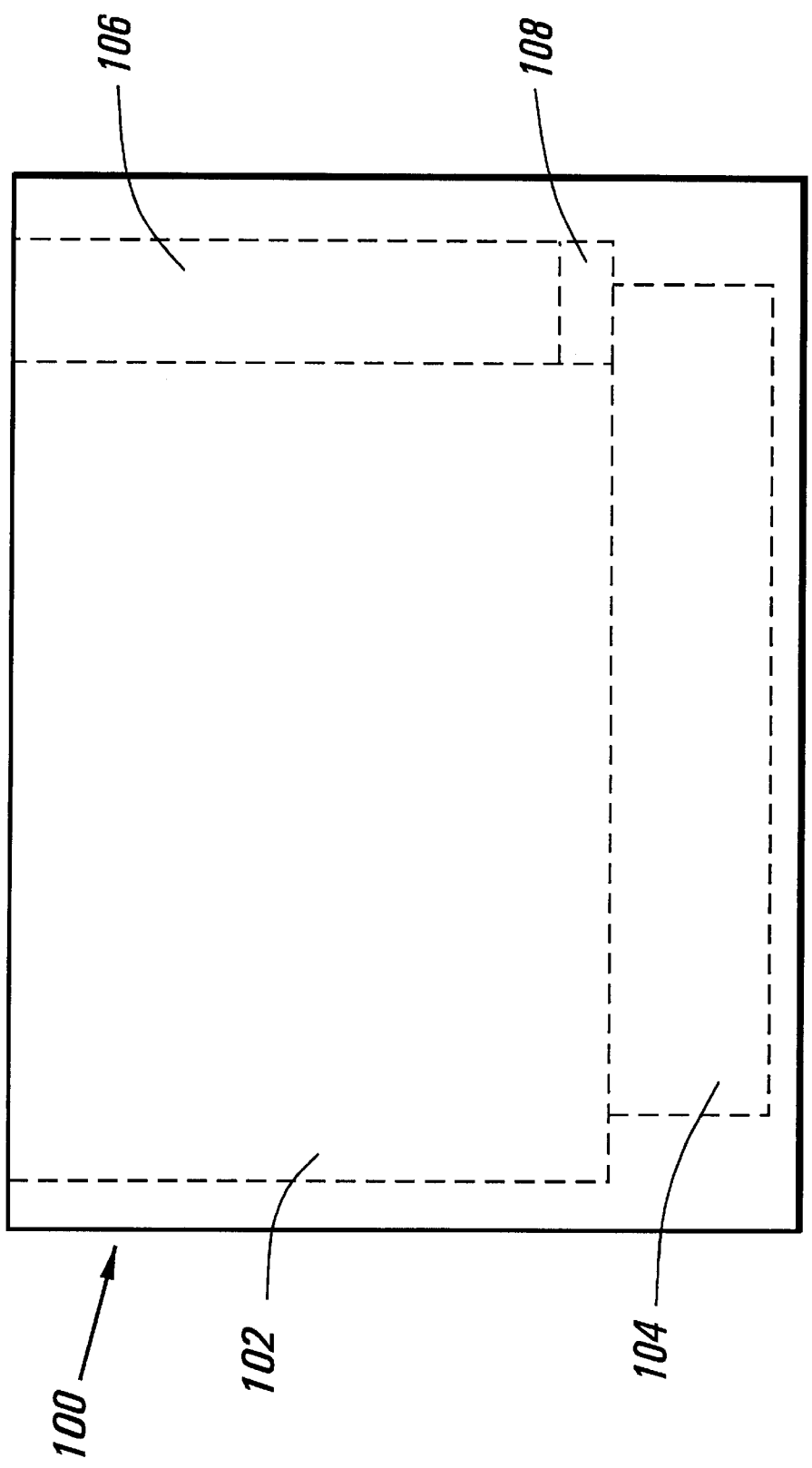

METHOD AND APPARATUS FOR COMPILING AUDIO/VIDEO INFORMATION FROM REMOTE SITES INTO A FINAL VIDEO PROGRAM

REFERENCE TO RELATED APPLICATIONS

This is a continuation-in-part of U.S. patent application Ser. No. 08/205,885, filed Mar. 3, 1994, now abandoned.

FIELD OF THE INVENTION

The present invention relates generally to audio and video recording development, and, in particular, to methods and apparatus whereby audio and video programs from remote sites, including such programs recorded in different formats, may be compiled into a final program or a master and duplicated to produce an audio/video periodical or other applications.

BACKGROUND OF THE INVENTION

Previous attempts to periodically publish video programs in accordance with a regular schedule have been hampered by the difficulty in producing the program master recordings and subsequently duplicating the required quantities of videotapes or discs quickly enough to permit timely distribution of the programs. Editing of the many segments is time-consuming and expensive, both in labor costs and also in equipment capital and operating costs. Often it may be necessary to produce the program master recording in only a few hours, and to duplicate the program overnight for delivery to the retail outlets while the information content is still current.

SUMMARY OF THE INVENTION

The present invention solves problems associated with the production of a program master recording by automating many of the time-consuming compilation and editing steps. According to the invention, the method of producing a master audio and/or video recording for duplication purposes includes the steps of receiving separate and/or combined audio clips and video images in digitally compressed form, including clips and images from remote sites. Text files associated with the audio clips and/or video images are also preferably received. At a master recording production facility, the compressed clips and images and any text files are stored until it is desired to produce a master, at which time the images are scan-converted into a single consistent video format. The scan-converted images and/or audio clips are then recorded onto a master medium which may then be duplicated for distribution purposes. As an alternative, the program may be replayed as many times as necessary to produce the required copies by conventional duplication means without the need for a separate master.

The invention may accommodate video and audio from a variety of sources 52 and in a variety of formats, with the program master recording or final presentation being assembled automatically by replaying the stored segments in a consistent output format and preferably in a predetermined sequence. A wide variety of consumer program distribution formats are also possible, including audio and video cassettes, audio and video discs of any format: magnetic, optical, or magnet-optical, Photo-CD's, or CD-ROM computer-based programs. Source materials 24 may also be drawn from any imaging format, including still-video images, motion video, scanned printed materials, computer graphical-based files, or animated graphics. To reduce storage requirements at the program master generation facility as the images are accumulated, and to allow the images to be transmitted from remote locations or other image-gathering means over conventional telephone lines, proprietary or public-domain data compression schemes, including the JPEG and MPEG formats, may be utilized for such transmissions. Other audio or audio/video based schemes may alternatively be used, including, for example, the ".WAV" format, the ".AVI" format, the "Quicktime" format associated with various PC-based multi-media platforms, or proprietary systems such as "MPower" for companies like Hewlett-Packard.

BRIEF DESCRIPTION OF THE DRAWINGS

FIG. 3 is a video screen layout diagram which illustrates one possible display configuration for a video presentation.

DETAILED DESCRIPTION OF THE PREFERRED EMBODIMENT

The system by which video masters may be created will now be explained by reference to FIG. 1, which, for clarity, shows the procedures for capturing, collecting, storing, and sequentially displaying images captured by still-video cameras. It should be understood, however, that the procedures and apparatus are equally applicable to motion video images, which may be considered to be a series of still images transmitted at a particular frame rate. The system as described is also equally effective for producing master tapes or presentation for television systems other than NTSC, as, for example, those employing alternative frame rates, a different number of scan lines, or other aspect ratios, including European PAL or SECAM formats, any of the current of proposed HDTV formats (such as the SMPTE 240M Standard), or the various specialized frame rates and systems employed in medical, industrial or computer imaging applications. In addition, the source material 24 should be understood to include, but not be limited by, still-video cameras, live video cameras and camcorders, computer generated images, Photo-CD or CD-ROM images, images supplied as stored in any of the various formats for magnetic, optical, or magneto-optical media, images supplied on film to be scanned into the computer, and images scanned from hard-copy printed materials.

Figure 1:
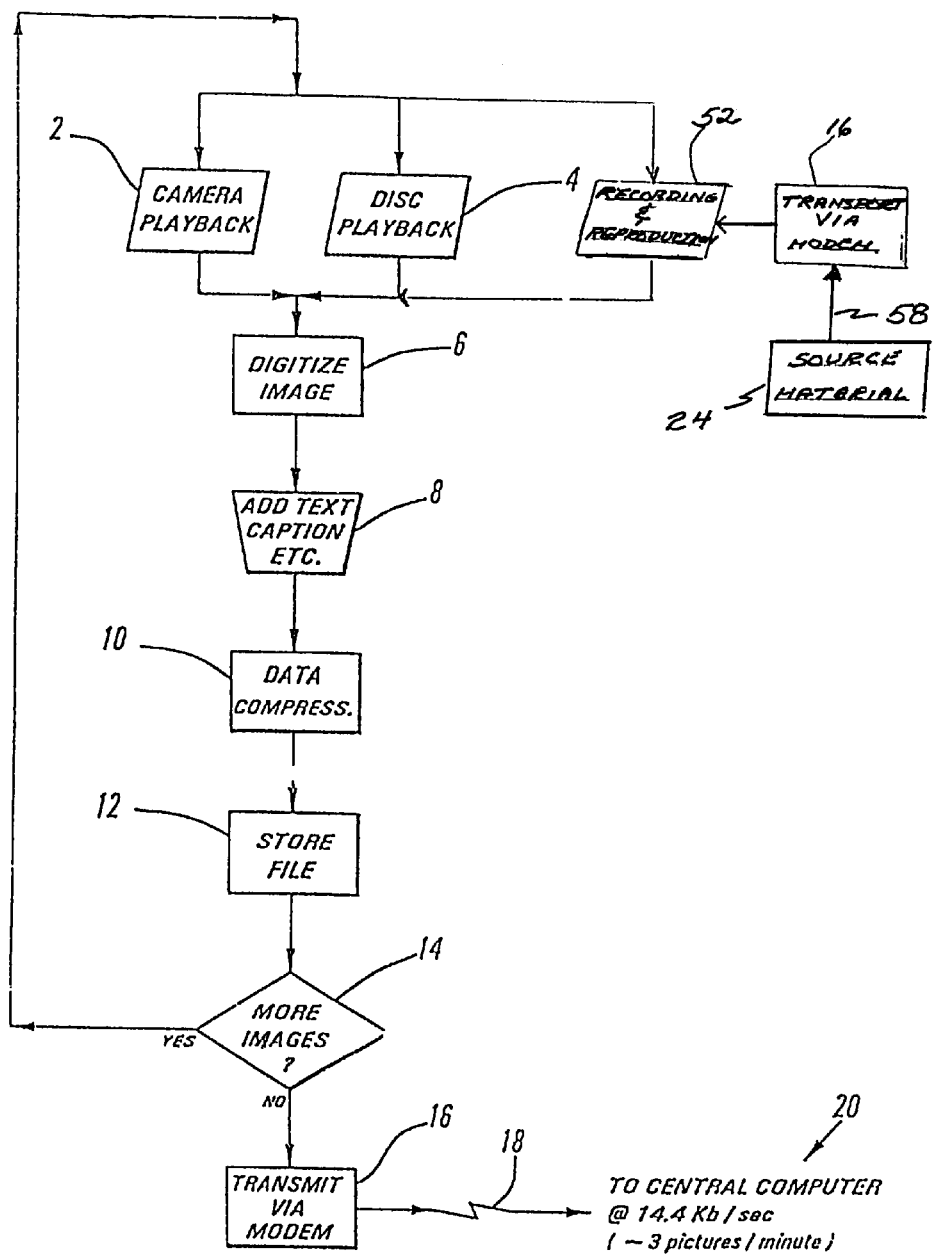
FIG. 1 is a flow diagram which illustrates apparatus and the method by which images may be captured for storage on a computer, both locally and also from remote sites.

FIG. 1 assumes by example a personal-computer-based system which relies upon the use of an industry-standard still-video camera at step 2, such as those offered by Sony Corporation or Canon, Inc. These cameras record either field or full-frame analog signals divided into Y (Luminame) and time-compressed, line-sequential R-Y/B-Y (Chrominance or C) components, using 2" magnetic floppy disks. This Y/R-Y/B-Y format uses frequency modulation (FM) techniques and frequencies identical to those employed in the Sony Betamm-SO format for videotape recording. In playback, these signals are converted into either a standard composite video signal or a conventional Y/C-3.58 format, as,.for example, used in S-VAS video recorders for NTSC. As an alternative, the 2' floppy disks may be played back in a specially-designed disk-player at step 4, as supplied by one of the camera manufacturers or any of several other manufacturers of video equipment. This Y/C signal is then connected to the input of a video digitizer circuit board at step 6 installed in the personal computer, such as the model SV-PC manufactured by Canon, Inc.

The digitizer captures the video signal and converts it to a 24-bit color signal, in which each pixel is assigned eight bits for each of the R, G, and B components. As an alternative, the signal may be captured in an 8-bit or 16-bit "color-mapped" format. The operator of the computer has the option of including a visible caption at step 8 or other information in the image using, for example, the "Paintbrush' software sold by Z-Soft, Inc., or performing other image manipulations, such as color adjustments or "special-effects." The text for any captions, either included in the image itself or in an area adjacent to the image, may be added automatically by the computer at the time of display, either by including the caption information as part of the image data file itself, or in a separate, associated data file. In addition, customized "Windows" based software may be used to speed the data entry by providing a guided input structure.

At this stage, a full-screen VGA-format computer image will typically contain more than 300 KiloBytes (for 8-bit color) or more than 900 KiloBytes (for 24-bit color) of data. For active or motion video, and even for large collections of still images, this volume of data is impractical for conventional magnetic storage methods on the computer's hard-disk or other media, since the volume of data and data transfer rates required for extended periods of active video playback exceed those available in conventional media storage. Therefore, the practical application of this technology makes use of data compression, such as the industry-standard JPEG data compression scheme for still-video images, or the commercially available Leadview software offered by Lead Technologies, Inc. This compression at step 10 is performed by using special computer software, and results in a so-called "lossy" data compression to approximately 25 to 35 KiloBytes per image. Higher or lower compression ratios may be employed, depending on the particular nature of the image content and the intended usage of the images, and there is no requirement that all images use the same data compression method, or that they use the same data compression ratio. This compressed image is then stored on the hard-disk in a separate file at step 12. The computer operator then determines, at step 14, whether there are additional images to capture, and, if so, the procedure repeats the steps as just described.

Cameras 52 which record their images directly onto disks in a format which is compatible with either IBM-PC disks or Apple Macintosh disks are becoming available, as are those using internal memory storage or PCMCIA-compatible storage devices. Their use would eliminate the need for a separate disk-player, as either these disks would be playable in the computer itself or else the camera memory contents may be "downloaded" from the camera to the computer through input(output port facilities 58. As an additional feature, such cameras 52 are capable of recording the images 24 as compressed-data files (for example, JPEG), which would render the separate hardware and software steps 6 and 10 unnecessary. However, if captions or other image manipulations are desired, it will be necessary to perform the decompression step described below, followed by another data-compression step as described above, after the modifications are completed. A further explanation of how text information may be associated with video images is disclosed in reference to FIG. 3 below.

When all of the images and any associated text or image files have been stored, the image-capture process is complete. If this procedure has been carried out on the computer that will be used for the image playback, no further action is required at this time. However, if the image-capture process has been performed at a remote computer, it will be necessary to either store the compressed images and any associated text or image files on conventional floppy discs for physical transportation to the site of the main computer, or else transmit them by a modem at step 16, through a data link at step 18 (i.e., a telephone line) to the main computer at step 20. Because the data compression has reduced the image file size to approximately 25 to 35 KiloBytes, a conventional 14.4 kbps data link will allow remote transmissions at a rate of approximately three images per minute, though the exact transmission rate will depend on the image data compression ratio selected, and faster modems, or the use of dedicated data lines, could result in faster transmission rates. As an alternative, as ISDN line, with appropriate interface facilities at each end, will allow images to be transmitted from a remote site to the main computer at a rate of approximately 20 images per minute. Where other alternatives are unavailable, the camera floppy-disks may be physically transported to either a remote computer site, or to the main computer itself.

After all of the images and any associated text or image files have been collected, they may be replayed in a predetermined sequence. For this purpose, the sequence may be determined from a prepared list or "script," or more simply, by assigning the individual eight-character file names so that the images may simply be presented in "alphabetical order." To the computer, this means that the names are assigned with reference to the ASCII values of the characters in the file names. For example, there would be an "A" sequence consisting of all file names beginning with the character "A." Within the A-sequence, the files would be presented in order by the next character, and so on. On this basis, the characters 0 through 9 would precede the characters A through Z. For most PC-based systems, file names do not distinguish between upper-case and lower-case characters, but on some other computer systems and operating systems, the file names may be case-sensitive, such that the upper-case character "Z" precedes the lower character "a" in the alphabetical sequence. Custom software could then be used to instruct the computer to retrieve, decompress, and display the images in alphabetical order. The same type of process may be used to produce an "index" or "table of contents" list which may be printed out for reference use.

Figure 2:
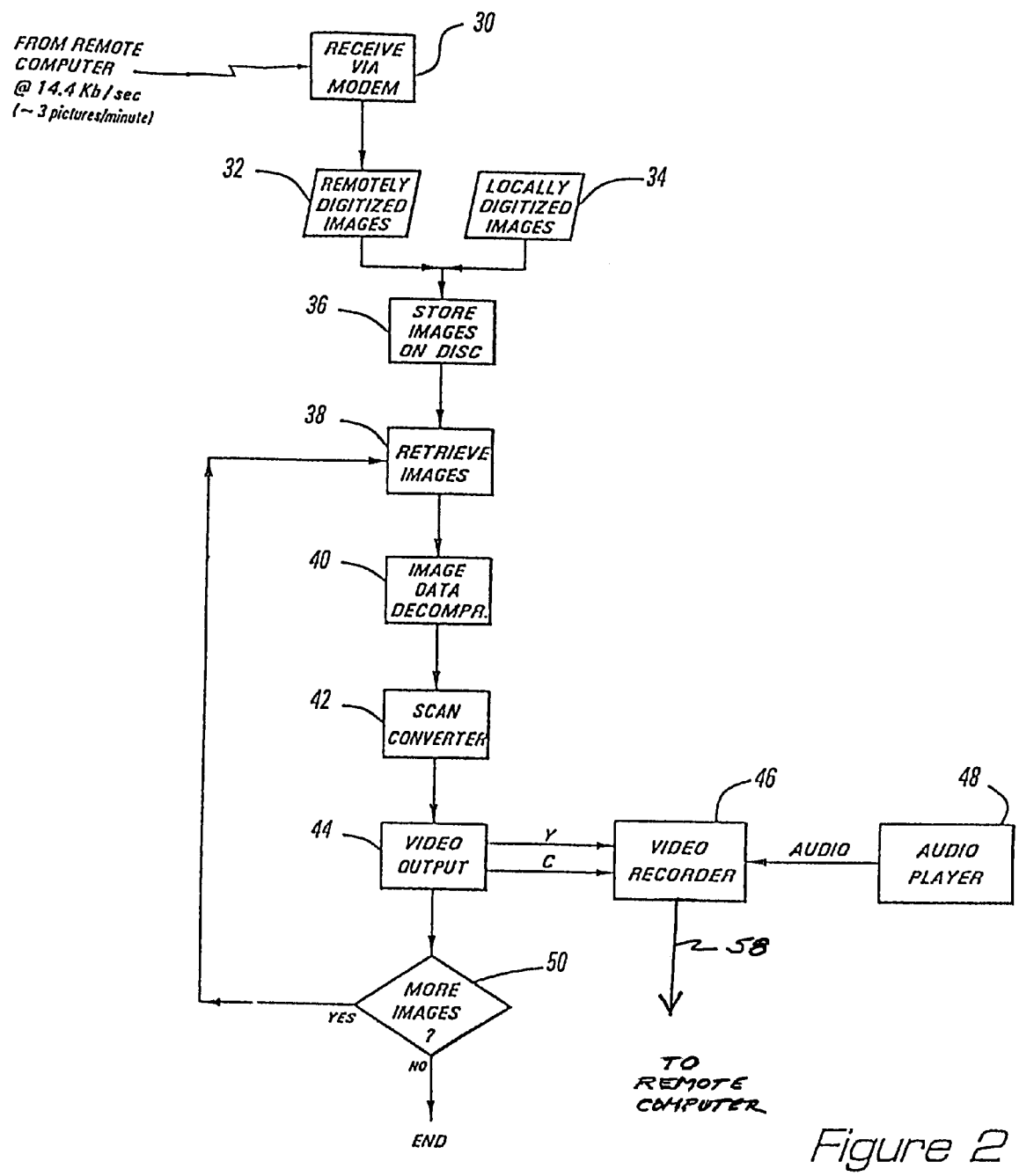
FIG. 2 is a flow diagram which shows how images which have been captured and stored on a computer may be retrieved and displayed in a predetermined sequence as a program source for video duplication or to create a program master video recording.

FIG. 2 shows the sequence of events relating to the playback of images. Images transmitted from remote computer systems are received via the modem at step 30, and stored on the main computer as remotely digitized images at step 32. In addition, there may be locally digitized images at step 34 which also have been stored directly onto the main computer hard-disk at step 36 by a process equivalent to that previously described in reference to FIG. 1. For the playback process, the images are retrieved at step 38 as data-compressed images and de-compressed at block 40 and loaded into the buffer of the video scan-converter display card at step 42 installed in the computer, manufactured by any of several sources, such as the HyperConverter scan-converter by PC Video Conversion Corp. The hardware and software of the video scan-converter display card convert the image to the desired video format. In this example the format is shown as NTSC video at step 44. To allow the recording of the best possible image at reasonable cost, the signal is recorded by one or more video recorders at step 46 in Y/C component format. At a higher cost, a full digital recording may be performed in RGB, composite, or component video format, or as any of several disc-based video or computer-graphics formats; lower cost recorders are available which record from composite video format.

A sound track of music, narration, or other audio may be added to the master recording from a source such as an analog or digital tape player or CD or mini-disc player at step 48. Alternatively, other video sources may be integrated into the recording. If the audio program materials have been collected and stored on the computer, or are stored as part of any combined audio/video format, they may be replayed by adding one of the commercially available sound plug-in boards, or by adding specialized hardware required for custom or proprietary audio and/or video formats. If desired, the operation of the recorder or players could optionally be controlled by the main computer through the RS-232 serial data port, using special software. The sequencing of the images continues at step 50 until the entire program has been displayed, a process that will require only as long as the program lasts; that is, the program is produced in real-time, such that a ninety-minute program would be completed in ninety minutes. In this manner, the master program recording for duplication of the programs onto tapes or discs will be available shortly after the last program material has been loaded onto the computer.

In practice, the length of the program is limited only by the amount of storage space available on the computer hard-disk. By adding storage devices utilizing removable media, the playing time may be "tended to any period desired, by simply exchanging the media as the program material is played back. Alternatively, extended playing times may be effected by switching between source materials stored on multiple computers, and directed to a single recording device. As the full-motion-video MPEG standards are finalized, it will be relatively straight-forward to adapt the equipment to work with MPEG files as well as JPEG or other data-compressed files, and such alternatives should be considered to be within the scope of this invention.

Once program materials are assembled it is possible to play back all or part of the program by transmitting it over telephone or cable communications links, much the same way as the image materials have been collected from remote sites. In this case, the inherent bi-directional nature of the communication link 56, 18 is exploited for those who desire to receive copies of the program material electronically, further enabling users to implement random-access control of the program material as if the program tape itself were physically located at the user location. For example, instead of fast-forwarding a videotape containing automobiles for sale to the section containing products of a particular manufacturer, the user simply calls for this specific product information, at which time the appropriate program material is transmitted 58 directly to the user, either as a video program or as the necessary compressed images and associated data files 24, from which the user may reproduce 52 the program locally. Alternatively, facilities may be provided to enable the user to scan through the program materials as a database, so that only user-selected products.

In yet another application of the invention, the main computer and associated scan-conversion facilities may be used as a direct source for playback during duplication. In this case, no program Master tape need be created, and the program presentation may be repeated as many times as necessary to complete the duplication process. In FIG. 2, the video recorder indicated as 46 would now represent a plurality of VTRs or duplication systems, thereby facilitating the copying of the program presentation in any distribution format desired.

One possible configuration for the screen display is shown in FIG. 3 generally at 100. A standard VGA-format screen having dimensions of 640 pixels (horizontal)×480 pixels (vertical) is preferably used, though, certainly other formats are equally applicable. Within the screen display is an image display area 102, shown with dimensions in pixels of 496×480. If a still video camera by Dyeam, Inc. is utilized, this image area will be completely filled by the camera output image; as an alternative, the area may contain one or more images from a variety of sources 24. A separate area 106 may be utilized to show product identification information, such as manufacturer name, manufacturer logo, or additional image information, and area 104 is designated for text information to describe the product. Associated text and image information is sequentially displayed, in accordance with the predetermined sequence, in which an image may correspond to any number of text files, or a text file may correspond to any number of images. A separate index counter displaying alphanumeric information at area 108 enables the viewer to locate individual products within the program. In order to assure that the "safe-action-area" for television displays is preserved, space has been left unused at the sides and bottom of the screen. As an example of a simple way to associate images with text files, a text file containing product description information to be displayed in the area designated 104 may be given a coded name. This name includes, for example, a particular letter in the name, from which the computer determines that it is to sequentially retrieve and display, in the area designated 102, the three similarly-named compressed image files with a related files designator. Further, a code at the beginning of the text file name may be used to designate product identification information or images (such as the manufacturer's name or logo) to be displayed in the designated area 106. In addition, a particular code in the text file name may be used to designate a particular product type within a particular classification. The index counter in this case might be a five-digit number, in which the first three digits were associated with the product identification information, and the last two digits with the particular product within that classification.

Examples of applications for this technology include advertising for such products as new or used automobiles, trucks, motorcycles, heavy equipment, and manufacturing equipment, used or damaged parts for various types of vehicles and industrial equipment, directories for professional and other services, real estate, video school yearbooks, product catalogs for furniture, appliances or the like, and personal or professional introduction and identification services.

Having described my invention, I claim:

1. A method of producing a video program, comprising the steps of:

customizing picture information by acquiring, digitizing, and data compressing the picture information from at least one remote site wherein the at least one remote site is in bidirectional communication with a master production facility;

associating the picture information at the remote site with a file name to form a picture information file;

storing the picture information file at the at least one remote site;

further customizing the picture information file by associating the file with at least one image file, transferring the picture information file and the at least one associated image file via a remote site initiated transmission from the at least one remote site to the master production facility where the following steps are performed;

accumulating the customized picture information file and the at least one associated image file transmitted from the at least one remote site to the master production facility, determining a format sequence according to the customized picture information file received from the at least one remote site, and storing the customized picture information file received from the at least one remote site at the master production facility;

decompressing the stored customized picture information file;

scan-converting the decompressed customized picture information file into a video program including the at least one associated image file, the video program having a single, consistent format in accordance with the determined format sequence; and distributing the video program back to the at least one remote site for further selectable customization.

2. The method of claim 1, including the step of receiving a digitized picture with superimposed textual information.

3. The method of claim 1, further including the step of receiving separate textual information associated with one or more digitized picture information files, to be displayed in conjunction with the picture information files.

4. The method of claim 1, further including the step of receiving data used to generate textural information to be output with the scan-converted picture information files in the single, desired video format.

5. The method of claim 1, further including the step of adding audio information to the program prior to distribution of the program.

6. The method of claim 1, including distributing the program in electronic form.

7. The method of claim 1, further including the steps of:

receiving audio clips in digitally compressed form, including such clips from remote sites;

compiling the audio clips on a storage medium;

decompressing the audio clips; and recording the audio clips onto the program prior to distribution of the program.

8. A method of producing a video program, comprising the steps of:

customizing at least one picture information element by acquiring, digitizing, and data-compressing the at least one picture information element from at least one remote site wherein the remote site is in bidirectional communication with a master production facility, the at least one picture information element being a subset of the video program;

associating the at least one picture information element at the remote site with a file name to form at least one picture information element file;

further customizing the picture information file by associating the file with at least one image file, transferring the at least one digitized, data compressed picture information element via a transmission initiated from the at least one remote site to a master production facility where the following steps are performed;

accumulating and storing the at least one picture information element file received from the at least one remote site;

decompressing the at least one picture information element file;

scan-converting the at least one decompressed picture information element file into a video program including the associated at least one image file, the video program having a single consistent format in accordance with a sequence determined at the time the at least one picture element file is stored; and distributing the video program back to the at least one remote site for further selectable customization.

9. The method of claim 8, wherein the image information is textual information, the method including the step of receiving a digitized or digital picture information element file with superimposed textual information.

10. The method of claim 8, wherein the image file is a textual information file, the method further including the step of receiving separately the textual information file associated with at least one digital picture information element file, the separate textual information file being displayed at a the at least one remote site in conjunction with the at least one picture information element file.

11. The method of claim 8, further including the step of receiving data used to generate textual information to be outputted with the at least one scan-converted picture information element file in the video format.

12. The method of claim 8, further including the step of adding audio information to the program prior to distribution of the program.

13. The method of claim 8, including distributing the program in electronic form.

14. The method of claim 8, further including the steps of:

receiving audio clips in digitally compressed form, including such clips from at least one remote sites;

compiling the audio clips on a storage medium;

decompressing the audio clips; and recording the audio clips onto the program prior to distribution of the program.

* * * * *